US007730184B2

(12) United States Patent
Camp, Jr.

(10) Patent No.: US 7,730,184 B2
(45) Date of Patent: Jun. 1, 2010

(54) DIGITAL RIGHTS MANAGEMENT BASED ON DEVICE PROXIMITY

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1122 days.

(21) Appl. No.: 11/164,289

(22) Filed: Nov. 17, 2005

(65) Prior Publication Data

US 2007/0113081 A1 May 17, 2007

(51) Int. Cl.
*G06F 15/173* (2006.01)

(52) U.S. Cl. .......................... 709/226; 705/51; 705/59; 707/10; 707/104.1; 709/217; 709/218; 709/229; 713/168; 715/201; 726/22

(58) Field of Classification Search .................. 713/168
See application file for complete search history.

(56) References Cited

U.S. PATENT DOCUMENTS

| 2005/0125302 | A1 | 6/2005 | Brown |
| 2006/0173782 | A1* | 8/2006 | Gargi ........................... 705/51 |
| 2006/0248115 | A1* | 11/2006 | Schmidt et al. ........... 707/104.1 |

FOREIGN PATENT DOCUMENTS

| EP | 1338992 | 8/2003 |
| WO | 2005057846 | 6/2005 |
| WO | 2005/057846 | 3/2007 |

OTHER PUBLICATIONS

Sony Ericsson Mobile Communications AB, International Application No. PCT/US06/026527, "Partial International Search" Jan. 12, 2007.
Sony Ericsson Mobile Communications AB, International Search Report, corresponding to International Patent Application No. PCT/US2006/026527, dated Jul. 11, 2007.
Sony Ericsson Mobile Communications AB, Written Opinion, corresponding to International Patent Application No. PCT/US2006/026527, dated Jul. 11, 2007.
Sony Ericsson Mobile Communications, AB, International Preliminary Report on Patentability, corresponding to International Patent Application No. PCT/US2006/026527, dated May 29, 2008.

* cited by examiner

*Primary Examiner*—William R Korzuch
*Assistant Examiner*—Bryan Wright
(74) *Attorney, Agent, or Firm*—R. Brian Drozd; Moore & Van Allen, PLLC

(57) ABSTRACT

The present invention discloses a digital rights management (DRM) system and method based on device proximity for controlling what devices can utilize DRM protected content. DRM data and DRM protected content are copied from a first device to a second device such that the DRM protected content on the first device becomes locked out and the copied DRM protected content is not locked out on the second device. The first device periodically performs a proximity check between the first and second devices such that if the first and second devices are determined to be within a short range of one another the DRM lockout of the first device is disabled.

20 Claims, 6 Drawing Sheets

DIGITAL RIGHTS MANAGEMENT BASED ON DEVICE PROXIMITY

BACKGROUND OF THE INVENTION

The present invention relates to portable mobile communications devices and systems, and more particularly to a portable mobile communications device, system and method that can manipulate a digital rights management (DRM) lockout based on a proximity to a second device.

Portable mobile communications devices such as mobile phones are becoming more sophisticated and include many new features and capabilities. One such feature is the capability to receive, store, and playback audio and video content such as music and video that is subject to copyright protection. Copyright holders seek to protect unauthorized electronic distribution of their content. One such means for preventing unauthorized electronic distribution of copyrighted content in electronic form is to embed DRM data into the content itself. The DRM data tracks and controls the ability to electronically distribute the content file between or among various playback devices. There are or can be multiple DRM schemes. A key function common to virtually any DRM scheme is the ability to lock and lock out the content to a particular device such that it may only be played on one device at a time.

The convenience factor for having copyrighted electronic content receivable, storable, and playable on a portable mobile communications device is high for mobile users. However, the user is typically constrained to listening or viewing the content on the portable mobile communications device only even if there are one or more secondary devices within short range of the portable mobile communications device. The secondary devices likely possess better playback characteristics than the portable mobile communications device such as, for instance, a stereo system for music or a television for video content.

What is needed is a means for enabling or disabling DRM lockout on a second device when the devices are in relatively close proximity.

BRIEF SUMMARY OF THE INVENTION

The present invention discloses a digital rights management (DRM) system and method based on device proximity for controlling what devices can utilize DRM protected content. DRM data and DRM protected content are copied from a first device to a second device such that the DRM protected content on the first device becomes locked out and the copied DRM protected content is not locked out on the second device. In a first embodiment, the second device periodically performs a proximity check searching for the first device. If the first and second devices are determined to be within a short range of one another the DRM lockout of the first device is disabled. In a second embodiment, the second device determines its location at the time the content and DRM transfer takes place between the first and second devices. This can be done with a location fixing device within the second device such as GPS and can be termed the transfer location. Then, whenever the second device determines it is within a specified range of the transfer location, it can initiate a DRM unlock procedure to unlock the content in the first device.

DETAILED DESCRIPTION OF THE INVENTION

Figure 1:
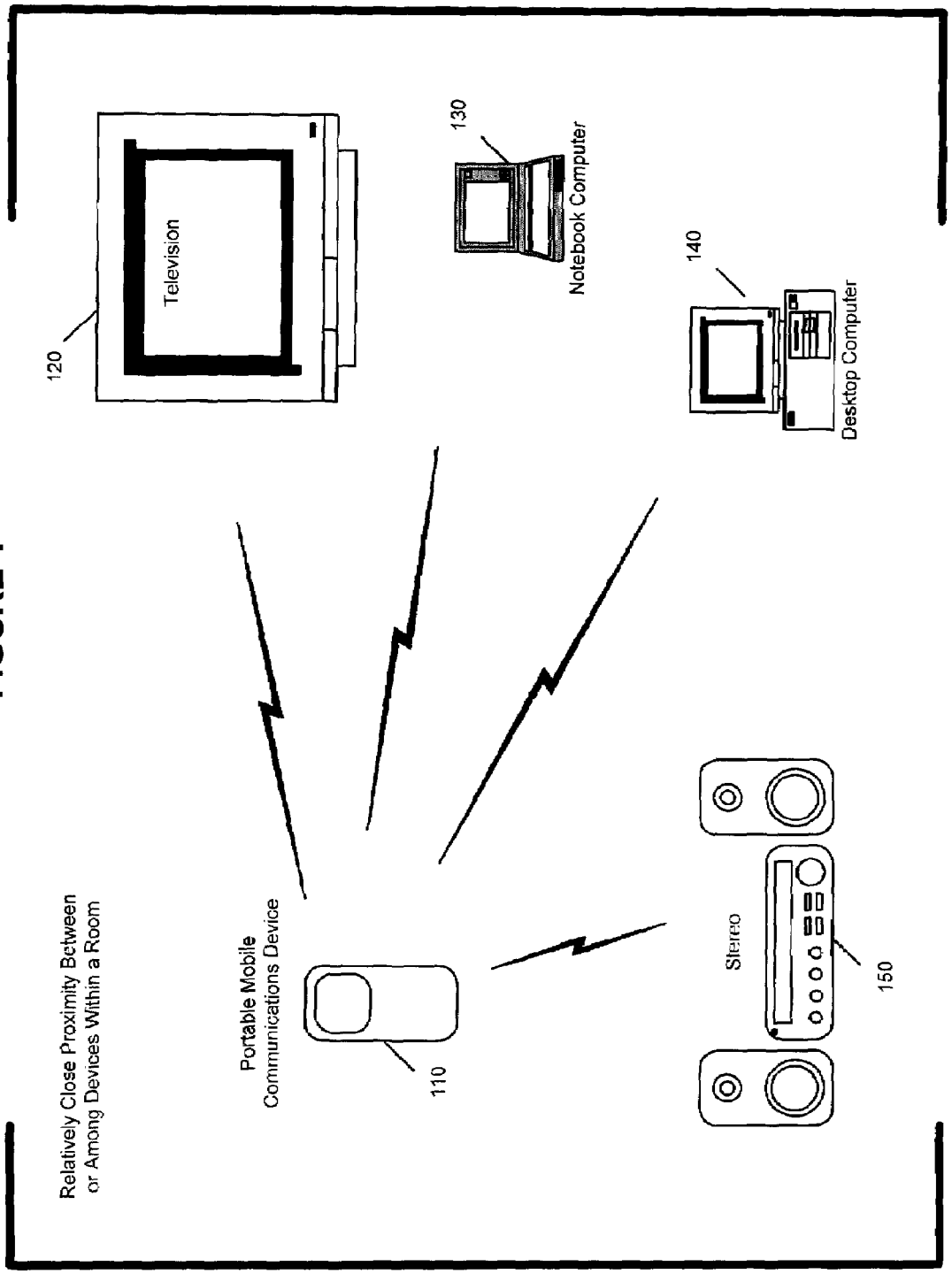
FIG. 1 is a block diagram of an exemplary system for managing digital rights management (DRM) data among multiple proximate devices.

FIG. 1 is a block diagram of an exemplary system for managing digital rights management (DRM) data among multiple proximate devices. The portable mobile communications device 110 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. The design of the portable mobile communications device 110 illustrated in FIG. 2 is for purposes of explaining the present invention and the present invention is not limited to any particular design.

Figure 2:
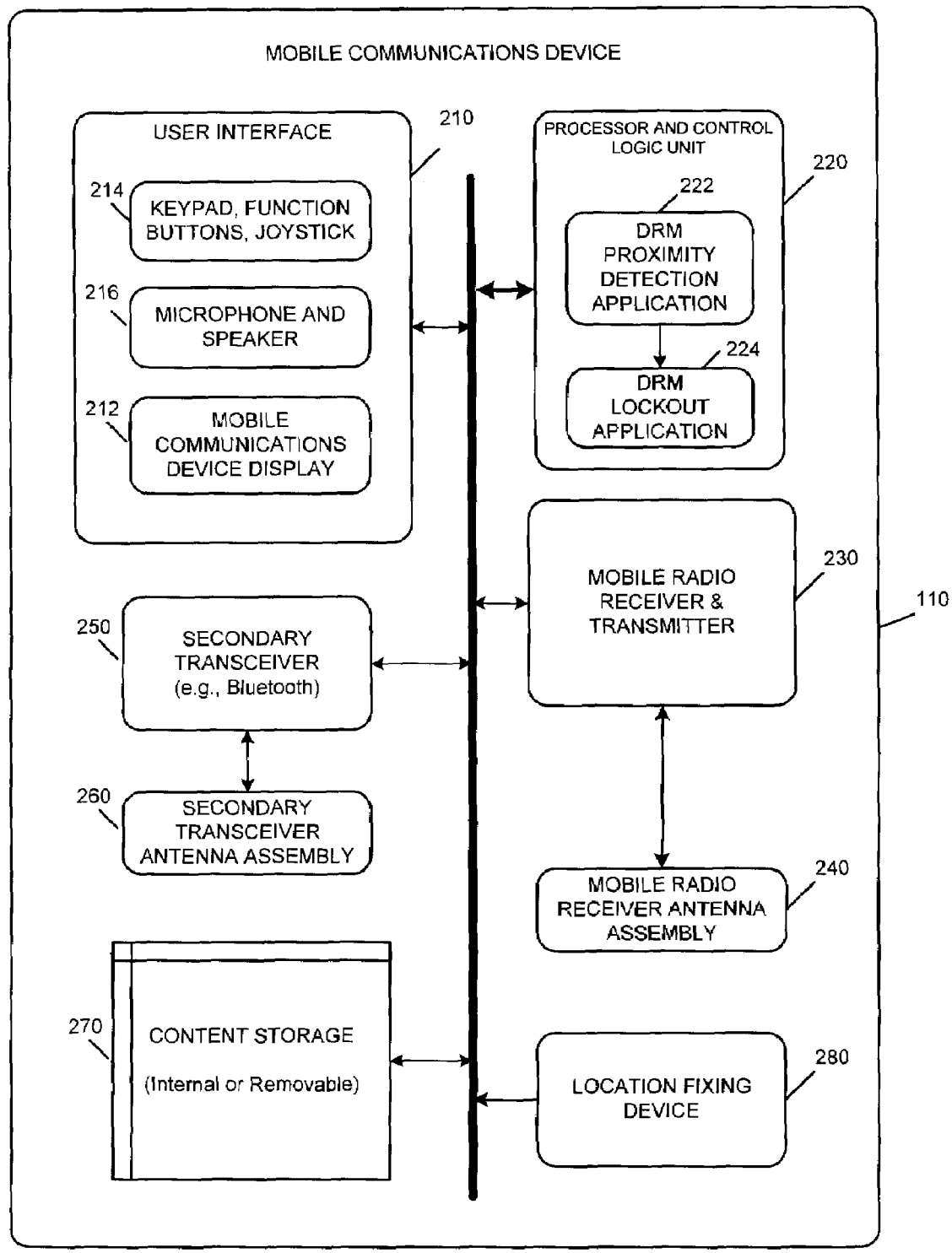
FIG. 2 is a block diagram of an exemplary portable mobile communications device for use within the system of FIG. 1.

The portable mobile communications device 110 shown in FIG. 2 may include an operator or user interface 210 to facilitate controlling operation of the portable mobile communications device 110 including initiating and conducting phone calls and other communications. The user interface 210 may include a display 212 to provide visual signals to a subscriber or user as to the status and operation of the portable mobile communications device 110. The display 212 may be a liquid crystal display (LCD) or the like capable of presenting color images. The display 212 may provide information to a user or operator in the form of images, text, numerals, characters, a graphical user interface (GUI) and the like. The display 212 may also be used to present programming carried by the mobile television broadcast signals.

The user interface 212 may also include a keypad and function keys or buttons 214 including a pointing device, such as a joystick or the like. The keypad, function buttons and joystick 214 permit the user to communicate commands to the portable mobile communications device 110 to dial phone numbers, initiate and terminate calls, establish other communications, such as access to a mobile TV provider, the Internet, send and receive email, text messages and the like. The keypad, function buttons and joystick 214 may also be used to control other operations of the portable mobile communications device 110. The keypad, function buttons and joystick 214 may also be implemented on a touch sensitive display adapted to receive tactile input.

The display 212, keypad, and function buttons 214 may be coupled to a main processor and control logic unit 220. The processor and control logic unit 220 may be a microprocessor or the like. The processor and logic unit 220 further include a DRM proximity application 222 and a DRM lockout application 224. The DRM proximity application 222 is responsible for determining the location of the portable mobile communications device 110 relative to another device with which the portable mobile communications device 110 is exchanging DRM and content data. The DRM lockout application 224 is responsible for initiating a DRM lockout disable procedure from the portable mobile communications device 110. It will disable the DRM lockout on the other device that it is exchanging DRM and content data with so long as the two devices are within a short range of one another.

The DRM proximity detection application 222 and DRM lockout application 224 may be embodied in hardware, firmware, software (data structures) or combinations thereof. The processor and logic unit 220 may also include other data structures, software programs, computer applications and the like to encode and decode control signals; perform communication procedures and other functions as described herein.

The user interface 210 may also include a microphone and a speaker 216. The microphone 216 may receive audio or acoustic signals from a user or from another acoustic source. The microphone 216 may convert the audio or acoustic signals to electrical signals. The microphone 216 may be connected to the processor and logic unit 220 wherein the processor and logic unit 220 may convert the electrical signals to baseband communication signals. The processor and control logic unit 220 may be connected to a mobile radio transmitter and receiver 230 that may convert baseband signals from the processor and control logic unit 220 to radio frequency (RF) signals. The mobile radio transmitter and receiver 230 may be connected to an antenna assembly 240 for transmission of the RF signals to a communication medium or system, such as a mobile radio access network (MRAN) 120 or the like. Mobile radio transmitter and receiver 230 can also receive mobile television broadcasts according to the MBMS standard. In this scenario, the MRAN 120 acts as the mobile television service provider.

The mobile radio antenna assembly 240 of portable mobile communications device 110 may receive RF signals over the air and transfer the RF signals to a mobile radio receiver and transmitter 230. The mobile radio receiver and transmitter 230 may convert the RF signals to baseband signals. The baseband signals may be applied to the processor and control logic unit 220 which may convert the baseband signals to electrical signals. The processor and control unit 220 may send the electrical signals to the speaker 216 which may convert the electrical signals to audio signals that can be understood by the user.

The portable mobile communications device 110 may also include a separate secondary transceiver 250 and secondary transceiver antenna assembly 260 to assist in the sending and receiving of short range wireless signals. The secondary transceiver 250 may be a Bluetooth™ device or other short range wireless transceiver including, but not limited to, 802.11x, WiFi, Ultrawide Band (wireless USB), or the like.

In addition, the portable mobile communications device 110 also includes content storage means 270 that can be fixed internally (RAM, ROM, Flash memory) or removable (Compact Flash Card, Memory Stick™, etc.)

The portable mobile communications device 110 may also include a location fixing device 280 to provide a mechanism or means to fix the location of the portable mobile communications device 110 at any give moment. With respect to the present invention, the location fixing device can record the location of the portable mobile communications device 110 when DRM data and content are received from another device. The location fixing device 280 can be, but is not limited to, a GPS device. A WiFi location fixing method can also be used if the portable mobile communications device 110 has a WiFi connection to a local network.

Other devices including, but not limited to, a television 120, a notebook computer 130, a desktop computer 140, or stereo system 150 can be options to exchange DRM data and content with the portable mobile communications device 110.

Figure 3:
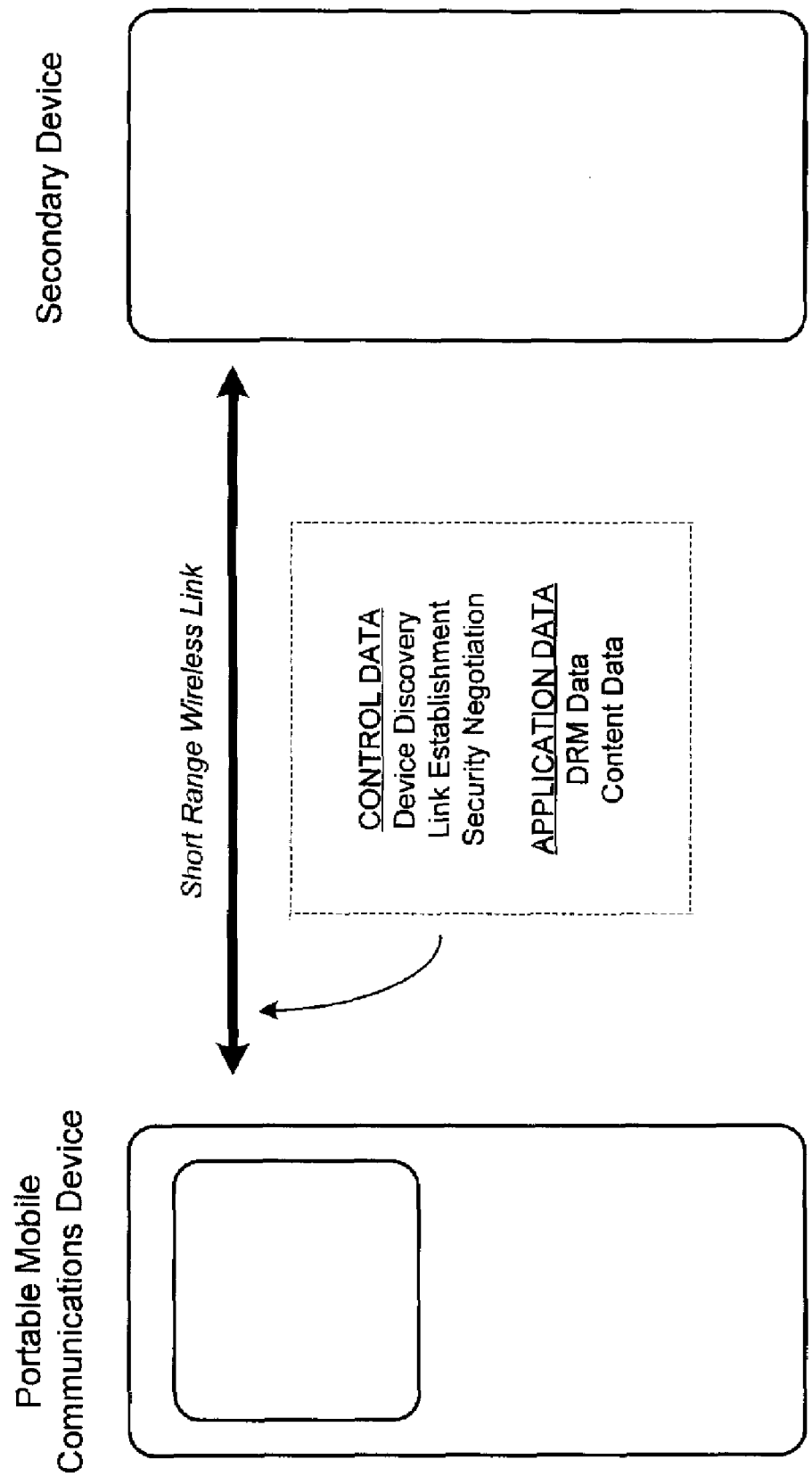
FIG. 3 is a block diagram of a portable mobile communications device capable of exchanging digital rights management (DRM) data with a secondary device.

FIG. 3 is a block diagram of a portable mobile communications device capable of exchanging digital rights management (DRM) data with another device. Either the portable mobile communications device or another device maintains the content that is DRM protected. Prior to exchanging any DRM data or content between the portable mobile communications device and the other device, the two devices must be discovered by one another and a secure communications link established. The particular control data to be used for discovery, link establishment, and security between the primary and secondary devices will depend on the wireless standard chosen. Options include, but are not limited to, Bluetooth™, 802.11x, RFID tags, WiFi, and wireless USB.

Figure 4:
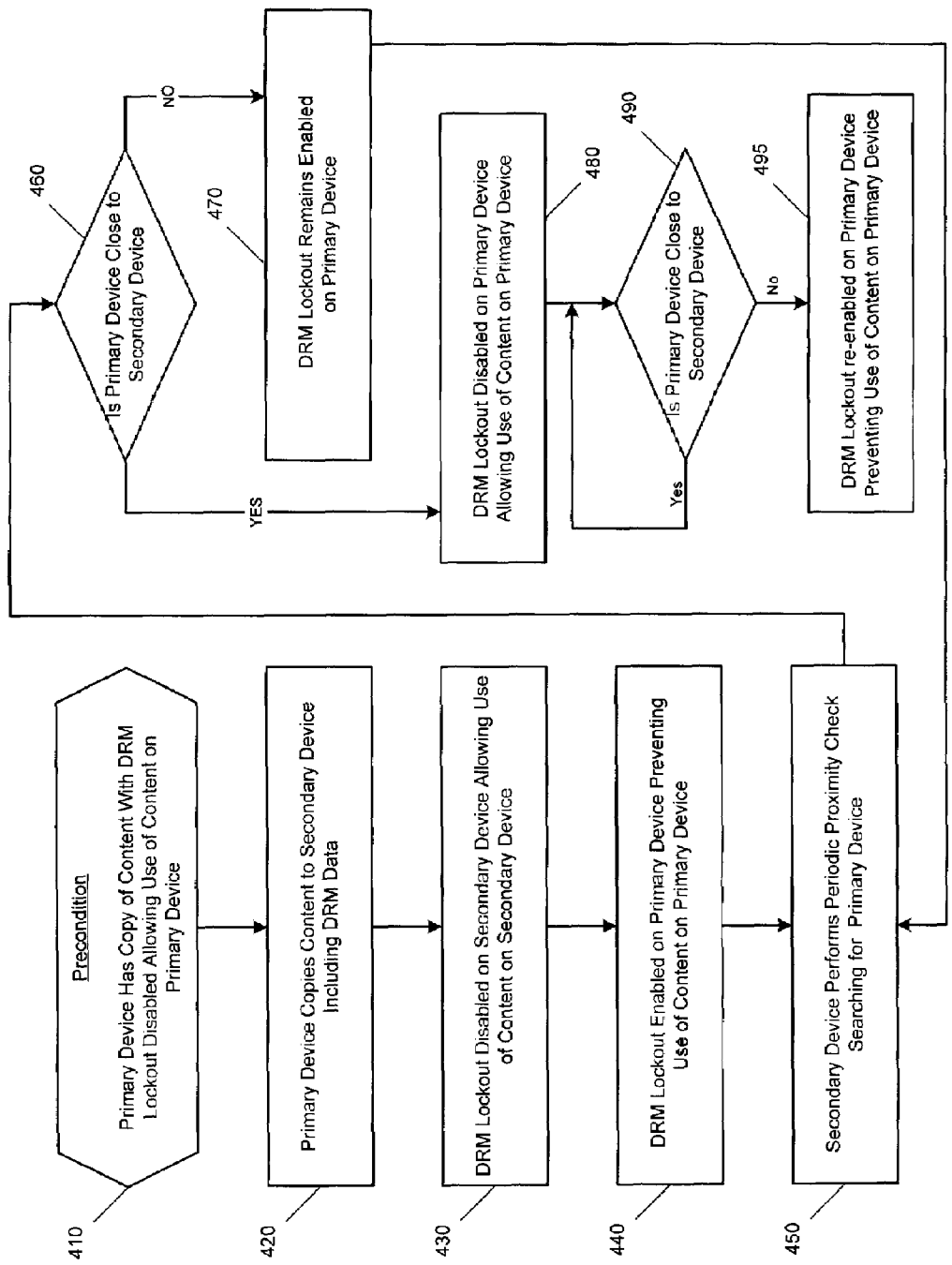
FIG. 4 is a data flow diagram of one embodiment for managing digital rights management (DRM) data among multiple proximate devices.

Once communications between the primary and secondary devices have been established, the primary and secondary devices can exchange proximity, DRM, and content data according to the methodology set out in FIG. 4 using a short range wireless communication device.

FIG. 4 is a data flow diagram of one embodiment for managing digital rights management (DRM) data among proximate devices. The terms primary device and secondary device are interchangeable in the sense that any device can be considered a primary device or a secondary device. The distinguishing feature for purposes of illustration between a primary device and a secondary device is that a primary device contains the original copy of copy-protected content along with any relevant DRM data. Typically, however, a portable mobile communications device 110 will be the secondary device and will receive a copy of the copy-protected content along with any relevant DRM data.

As a precondition in block 410 the primary device possesses a copy of the content with DRM lockout disabled to allow use of the content on the primary device. In block 420, the primary device copies the content and DRM data to a secondary device. In block 430, the DRM lockout is disabled on the secondary device allowing the use of the content on the secondary device which can be a portable mobile communications device. In block 440, DRM lockout is enabled on the primary device as soon as it checks out a copy of the content to another device. This prevents the primary device from using the content while it is checked out to another device. In block 450, the receiving secondary device performs periodic proximity checks to determine whether the primary device is nearby.

This is illustrated further in decision block 460. If using Bluetooth™ as the proximity detection mechanism, then the mere fact that the primary and secondary devices can recognize each other's existence will satisfy the proximity check since Bluetooth™ is, by nature, a limited short range wireless protocol.

A radio-frequency identification (RFID) system can also be used as a proximity detection mechanism. An RFID system has three parts, a scanning antenna, a transceiver with a decoder to interpret the data, and a transponder—the radio-frequency tag—that has been programmed with information. The scanning antenna puts out radio-frequency signals in a relatively short range. The RF radiation does two things; it provides a means of communicating with the transponder tag (the RFID chip) and, in the case of passive RFID tags, it provides the RFID device with the energy to communicate. Thus, passive RFID devices do not need to contain batteries. When an RFID tag passes through the field of the scanning antenna, it detects the activation signal from the antenna. That "wakes up" the RFID chip, and it transmits the information on its microchip to be picked up by the scanning antenna. The mere fact that there is an exchange of any data signifies that the devices are in close proximity of one another.

If the result of decision block 460 is negative then DRM lockout remains enabled on the primary device according to block 470 because the devices are not in close enough proximity to trigger a DRM lockout disable for the primary device. The flow of control is then sent back to block 450 to await the next periodic device proximity check. If the result of decision block 460 is positive, however, then DRM lockout is disabled on the primary device according to block 480 because the devices are close enough in proximity to trigger a DRM lockout disable for the primary device. The primary device will remain unlocked so long as it remains in close proximity to the secondary device. Periodic proximity checks are continued in block 490. When the primary and secondary devices are no longer close enough to one another, the DRM lockout on the primary device is enabled again in block 495.

Figure 5:
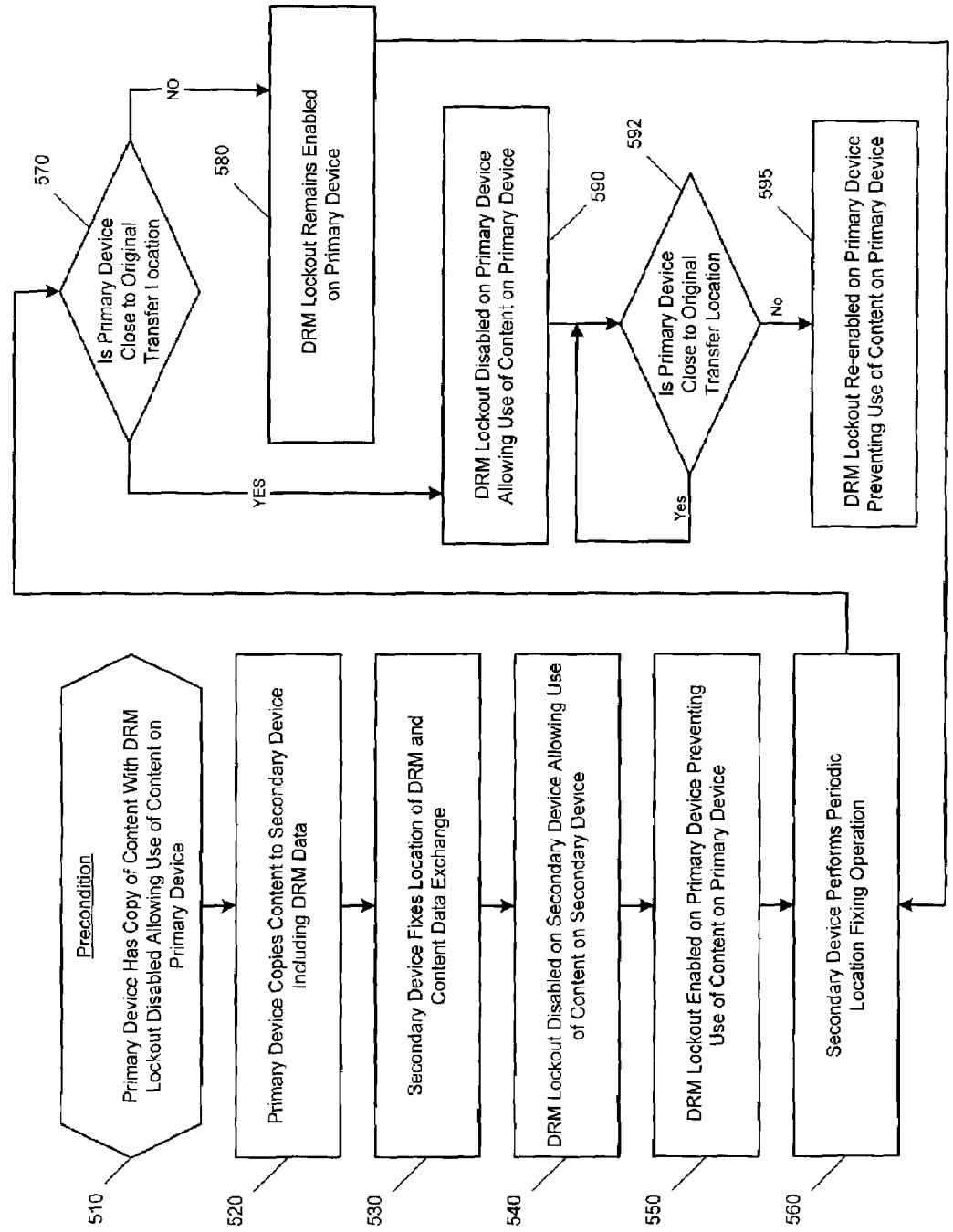
FIG. 5 is a data flow diagram of another embodiment for managing digital rights management (DRM) data among multiple proximate devices.

FIG. 5 is a data flow diagram of another embodiment for managing digital rights management (DRM) data among proximate devices. The same precondition described in FIG. 4 is present in block 510 of FIG. 5 wherein the primary device possesses a copy of the content with DRM lockout disabled to allow use of the content on the primary device. In block 520, the primary device copies the content and DRM data to a secondary device. In block 530, the secondary device performs a location fixing operation that records the location of the secondary device when the transfer of DRM and content data was received from the primary device. The purpose of the location fixing operation is to establish a proximity where the primary and secondary devices are close to one another.

In block 540, the DRM lockout is disabled on the secondary device allowing the use of the content on the secondary device which can be a portable mobile communications device. In block 550, DRM lockout is enabled on the primary device as soon as it checks out a copy of the content to another device. This prevents the primary device from using the content while it is checked out to another device. In block 560, the receiving secondary device performs periodic location fixing operations to determine whether the secondary device is at or near the location of the secondary device when the transfer of DRM and content data was received from the primary device.

This is illustrated further in decision block 570. If the result of decision block 570 is negative then DRM lockout remains enabled on the primary device according to block 580 because the devices are not in close enough proximity to trigger a DRM lockout disable for the primary device. The flow of control is then sent back to block 560 to await the next periodic location fixing operation. If the result of decision block 570 is positive, however, then DRM lockout is disabled on the primary device according to block 590 because the devices are close enough in proximity to trigger a DRM lockout disable for the primary device. The primary device will remain unlocked so long as it remains in close proximity to original transfer location. Periodic location checks are continued in block 592. When the secondary device is no longer close enough to the original transfer location, the DRM lockout on the primary device is enabled again in block 595.

A DRM lockout disable (or re-enable) can be triggered from the secondary device back to the primary device by passing a token from device to device. The token could be encrypted in order to assure the DRM rights holder that it would not be tampered with. The token would act like a key, in that when the secondary device is nearby and the token is sent to the primary device, the DRM function then permits playing the content on the primary device until the proximity of the devices changes to where the secondary device is no longer close to the primary device. The proximity detection mechanisms ensure that the token is not sent from a greater distance and misused. The token can also be some form of rolling key that changes with each usage to further prevent misuse.

The present invention calls for DRM disabling when the primary and secondary devices are in close proximity, or within a short range of one another. The actual distance between the primary and secondary devices is not a fixed value per se. Short range, nearby, and in the proximity of are intended to mean that the primary and secondary devices are close enough that the user can receive the benefits of a higher quality playback of content over the primary device even if the content is checked out to the secondary device. Thus, it stands to reason that short range would not likely exceed 100 feet.

Figure 6:
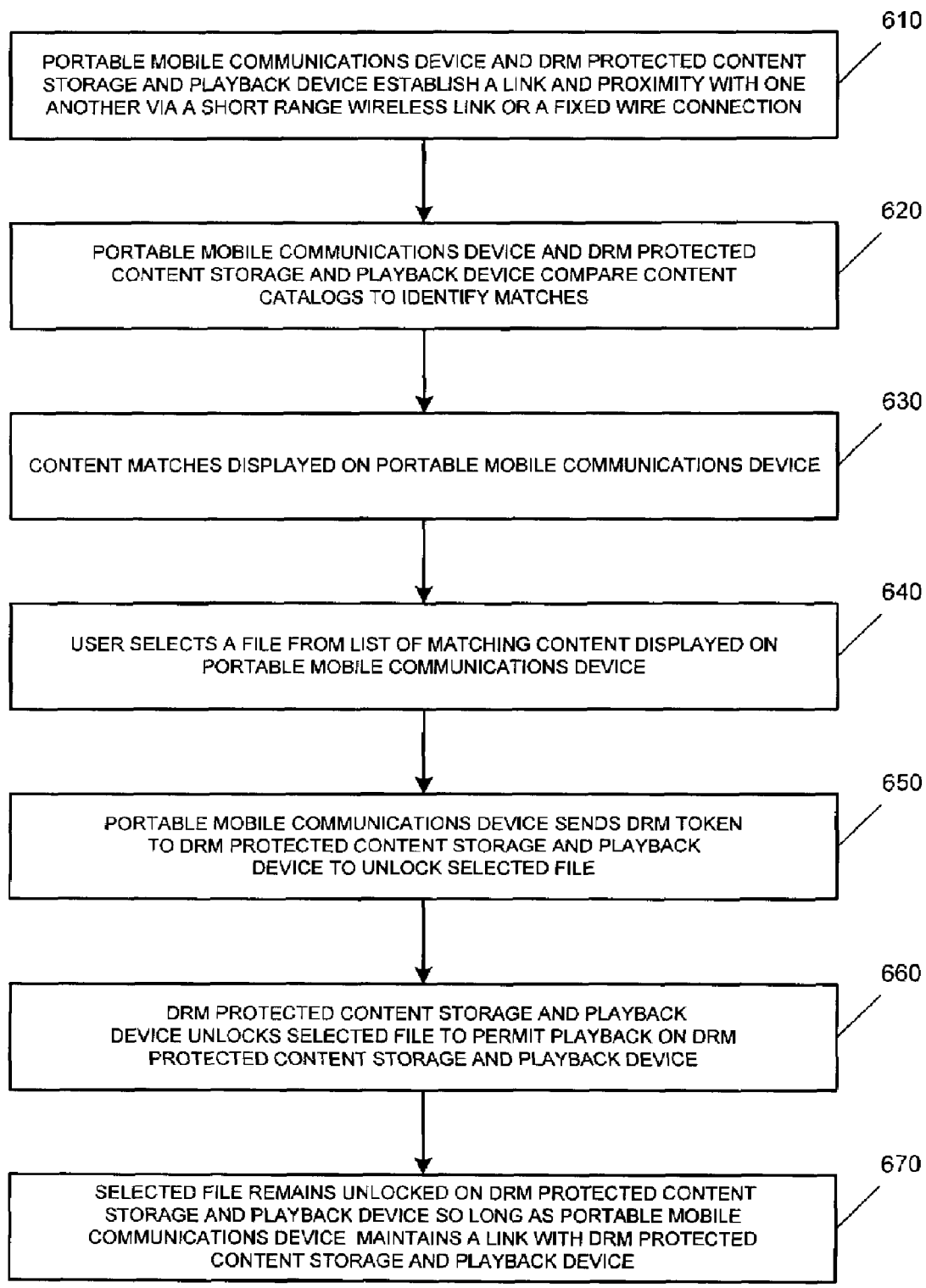
FIG. 6 is a data flow diagram of yet another embodiment for managing digital rights management (DRM) data among multiple proximate devices.

FIG. 6 describes another embodiment in which a portable mobile communications device can unlock the content of a generic DRM protected content storage and playback device. In this embodiment, the DRM protected content storage and playback device contains a catalog of DRM protected content. The portable mobile communications device has its own catalog of DRM protected content. The idea is that common content shared by both devices can be played on the DRM protected content storage and playback device at the request of the portable mobile communications device. In block 610, the portable mobile communications device and the DRM protected content storage and playback device establish a link with one another. The link can be a point to point direct wired or wireless link. In addition to acknowledging one another, the link also establishes a proximity of the devices. In block 620, the portable mobile communications device and the DRM protected content storage and playback device compare their respective content catalogs to determine if there are any content files that are the same on both devices. In block 630, any content matches are displayed on the portable mobile communications device. In block 640, the user can navigate the displayed list of content matches in order to select one for playback on the DRM protected content storage and playback device. In block 650, the portable mobile communications device sends a DRM token to the DRM protected content storage and playback device to verify its authority to unlock the selected file on the DRM protected content storage and playback device. In block 660, the DRM protected content storage and playback device receives and processes the DRM token from the portable mobile communications device to unlock and allow playback of the selected file on the DRM protected content storage and playback device. In block 670, a security feature monitors the link established between the portable mobile communications device and the DRM protected content storage and playback device and will stop playback of the selected file if the link is broken. The content file will then be re-locked on the DRM protected content storage and playback device.

Any prompts associated with the invention may be presented and responded to via an interactive voice feature, a graphical user interface (GUI) presented on the display of the portable mobile communications device, or the like.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, a semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A digital rights management (DRM) method based on device proximity for controlling what devices can play DRM protected content, the method comprising:
    copying DRM data and DRM protected content from the primary device to a secondary device;
    locking out the DRM protected content on the primary device and not locking out the copied DRM protected content on the secondary device, the lockout of the primary device being performed by a DRM lockout application resident on the secondary device as soon as the DRM data and DRM protected content are copied from the primary device to the secondary device; and
    determining the proximity between the primary and secondary devices such that if the primary and secondary devices are determined to be within a short range of one another the DRM lockout of the primary device is disabled, the proximity determination being performed by a DRM proximity application resident on the secondary device.

2. The digital rights management (DRM) method of claim 1 further comprising periodically re-determining the proximity, by the secondary device, between the primary and secondary devices once they have been determined to be within a short range of one another such that if the secondary device is subsequently no longer determined to be within a short range of the primary device, the DRM lockout of the primary device is re-enabled.

3. A digital rights management (DRM) method for controlling what devices can play DRM protected content, the method comprising:
- copying DRM data and DRM protected content from a primary device to a secondary device such that the DRM protected content on the primary device becomes locked out and the copied DRM protected content is not locked out on the secondary device, the lockout of the primary device being performed by a DRM lockout application resident on the secondary device as soon as the DRM data and DRM protected content are copied from the primary device to the secondary device; and
- determining a location of the secondary device where the copying of DRM data and DRM protected content from a primary device to a secondary device took place such that if the secondary device is subsequently determined to be within a short range of the original location where the copying took place, the DRM lockout of the primary device is disabled, the location determination being performed by a DRM proximity application resident on the secondary device.

4. The digital rights management (DRM) method of claim 2 further comprising periodically re-determining the location of the secondary device once it has been determined to be within a short range of the original location where the copying took place, such that if the secondary device is subsequently no longer determined to be within a short range of the original location where the copying took place, the DRM lockout of the primary device is re-enabled.

5. A portable mobile communications device for controlling what devices can play digital rights management (DRM) protected content based on device proximity, the portable mobile communications device comprising:
- storage means for storing DRM data and DRM protected content;
- a transceiver for exchanging DRM data and DRM protected content with a primary device;
- a DRM proximity application for determining the proximity between the portable mobile communications device and the primary device; and
- a DRM lockout application communicable with the primary device via the transceiver, the DRM lockout application capable of enabling and disabling DRM lockout of DRM protected content on the primary device when the portable mobile communications device and the primary device are determined to be within a short range of one another, the lockout of the primary device being performed by a DRM lockout application resident on the secondary device as soon as the DRM data and DRM protected content are copied from the primary device to the secondary device.

6. The portable mobile communications device of claim 5 wherein the DRM proximity application periodically re-determines the proximity between the primary and secondary devices once they have been determined to be within a short range of one another such that if the secondary device is subsequently no longer determined to be within a short range of the primary device, the DRM lockout application re-enables DRM lockout of the primary device.

7. The portable mobile communications device of claim 5 wherein the storage means for storing DRM data and DRM protected content is internally fixed within the portable mobile communications device.

8. The portable mobile communications device of claim 5 wherein the content storage means for storing DRM data and DRM protected content is a removable storage means.

9. A portable mobile communications device for controlling what devices can play digital rights management (DRM) protected content based on device proximity, the portable mobile communications device comprising:
- storage means for storing DRM data and DRM protected content;
- a transceiver for exchanging DRM data and DRM protected content with a primary device;
- a DRM proximity application for determining the location of the portable mobile communications device when DRM data and DRM protected content was originally exchanged; and
- a DRM lockout application communicable with the primary device via the transceiver, the DRM lockout application capable of enabling and disabling DRM lockout of DRM protected content on the primary device when the portable mobile communications device is determined to be within a short range of the location of the portable mobile communications device when DRM data and DRM protected content was originally exchanged, the lockout of the primary device being performed by a DRM lockout application resident on the secondary device as soon as the DRM data and DRM protected content are copied from the primary device to the secondary device.

10. The portable mobile communications device of claim 9 wherein the DRM proximity application periodically re-determines the location of the portable mobile communications device once it has been determined to be within a short range of the original location where the copying took place such that if the portable mobile communications device is subsequently no longer determined to be within a short range of the original location where the copying took place, the DRM lockout application re-enables DRM lockout of the primary device.

11. The portable mobile communications device of claim 9 wherein the storage means for storing DRM data and DRM protected content is internally fixed within the portable mobile communications device.

12. The portable mobile communications device of claim 9 wherein the content storage means for storing DRM data and DRM protected content is a removable storage means.

13. A computer program product embodied on a computer readable storage medium for digital rights management (DRM) based on device proximity that controls what devices can play DRM protected content, the computer program product comprising:
- computer program code for copying DRM data and DRM protected content from the primary device to a secondary device,
- locking out the DRM protected content on the primary device and not locking out the copied DRM protected content on the secondary device, the lockout of the primary device being performed by a DRM lockout application resident on the secondary device as soon as the DRM data and DRM protected content are copied from the primary device to the secondary device; and
- computer program code for determining the proximity between the primary and secondary devices such that if the primary and secondary devices are determined to be within a short range of one another the DRM lockout of the primary device is disabled, the proximity determination being performed by a DRM proximity application resident on the secondary device.

14. The computer program product embodied on a computer readable storage medium of claim 13 further comprising computer program code for periodically re-determining the proximity, by the secondary device, between the primary and secondary devices once they have been determined to be within a short range of one another such that if the secondary device is subsequently no longer determined to be within a short range of the primary device, the DRM lockout of the primary device is re-enabled.

15. A computer program product embodied on a computer readable storage medium for digital rights management (DRM) that controls what devices can play DRM protected content, the computer program product comprising:

computer program code for copying DRM data and DRM protected content from a primary device to a secondary device such that the DRM protected content on the primary device becomes locked out and the copied DRM protected content is not locked out on the secondary device, the lockout of the primary device being performed by a DRM lockout application resident on the secondary device as soon as the DRM data and DRM protected content are copied from the primary device to the secondary device; and computer program code for determining a location of the secondary device where the copying of DRM data and DRM protected content from a primary device to a secondary device took place such that if the secondary device is subsequently determined to be within a short range of the original location where the copying took place, the DRM lockout of the primary device is disabled, the location determination being performed by a DRM proximity application resident on the secondary device.

16. The computer program product embodied on a computer readable storage medium of claim 15 further comprising computer program code for periodically re-determining the location of the secondary device once it has been determined to be within a short range of the original location where the copying took place, such that if the secondary device is subsequently no longer determined to be within a short range of the original location where the copying took place, the DRM lockout of the primary device is re-enabled.

17. A digital rights management (DRM) method for a portable mobile communications device based on device proximity for controlling what devices can play DRM protected content, the method comprising:

establishing a link between the portable mobile communications device and a DRM protected content storage and playback device;

comparing the content catalog of the DRM protected content storage and playback device with the content catalog of the portable mobile communications device to determine if there are any matching content files on both devices;

displaying matching DRM protected content files on the portable mobile communications device;

selecting a matching DRM protected content files for playback on the DRM protected content storage and playback device; and sending a DRM token to the DRM protected content storage and playback device to verify its authority to unlock and play the selected DRM protected content file on the DRM protected content storage and playback device.

18. The digital rights management (DRM) method of claim 17 wherein the link established between the portable mobile communications device and a DRM protected content storage and playback device is a short range wireless link.

19. The digital rights management (DRM) method of claim 17 wherein the link established between the portable mobile communications device and a DRM protected content storage and playback device is a point to point direct wired link.

20. The digital rights management (DRM) method of claim 17 wherein playback of the selected DRM protected content file is terminated if the link established between the portable mobile communications device and a DRM protected content storage and playback device is broken.

* * * * *